March 17, 1925.

H. W. BAMBER

AUTOMOBILE PRODUCER GAS PLANT

Filed Aug. 31, 1921

1,529,764

INVENTOR:
Herbert W. Bamber
BY
Wm Wallace White
ATTY.

Patented Mar. 17, 1925.

1,529,764

UNITED STATES PATENT OFFICE.

HERBERT WILLIAM BAMBER, OF LONDON, ENGLAND.

AUTOMOBILE PRODUCER-GAS PLANT.

Application filed August 31, 1921. Serial No. 497,317.

(GRANTED UNDER THE PROVISIONS OF THE ACT OF MARCH 3, 1921, 41 STAT. L., 1313.)

*To all whom it may concern:*

Be it known that I, HERBERT WILLIAM BAMBER, a subject of the King of Great Britain, and resident of London, England, have invented certain new and useful Improvements in Automobile Producer-Gas Plants (for which I have received a patent in England, No. 121,161), of which the following is a specification.

The object of this invention is to provide a device by means of which the amount of water passing into the furnace of a gas producer of an automobile is correctly regulated in accordance with the requirements of the said producer at any given moment.

To effect this object I interconnect the valve controlling the egress of gas from the producer with a valve controlling the supply of water to the furnace of the said producer in such a manner that the amount of water allowed to pass to the furnace of the producer is directly proportionate to the amount of gas passing from the producer through the said egress valve at any given moment.

When the producer is used to drive an internal combustion engine directly, that is to say, without the interposition of a gas holder, the throttle valve of the said internal combustion engine may be interconnected with the valve controlling the water supply and therefore the engine throttle valve may take the place of the before mentioned egress valve for the purpose of this device.

Such apparatus is particularly useful in connection with motor driven vehicles wherein producer gas is employed as the fuel for the internal combustion engine, and the water supply to the producer or generator may be delivered thereto by means of an elevated storage tank with a float chamber (similar to that employed in connection with the well known hydrocarbon carburetter) interposed between the said storage tank and the conduit leading to the nozzle within the generator wherein the water is to be supplied. It is not however always necessary to employ a float chamber.

In order that the invention may be clearly understood reference may now be had to the accompanying drawings, in which—

Figure 1:
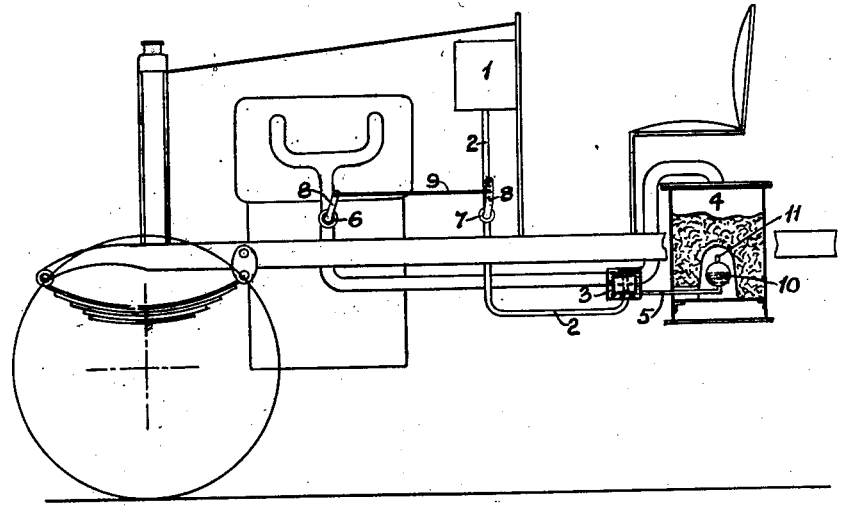
Figure 2:
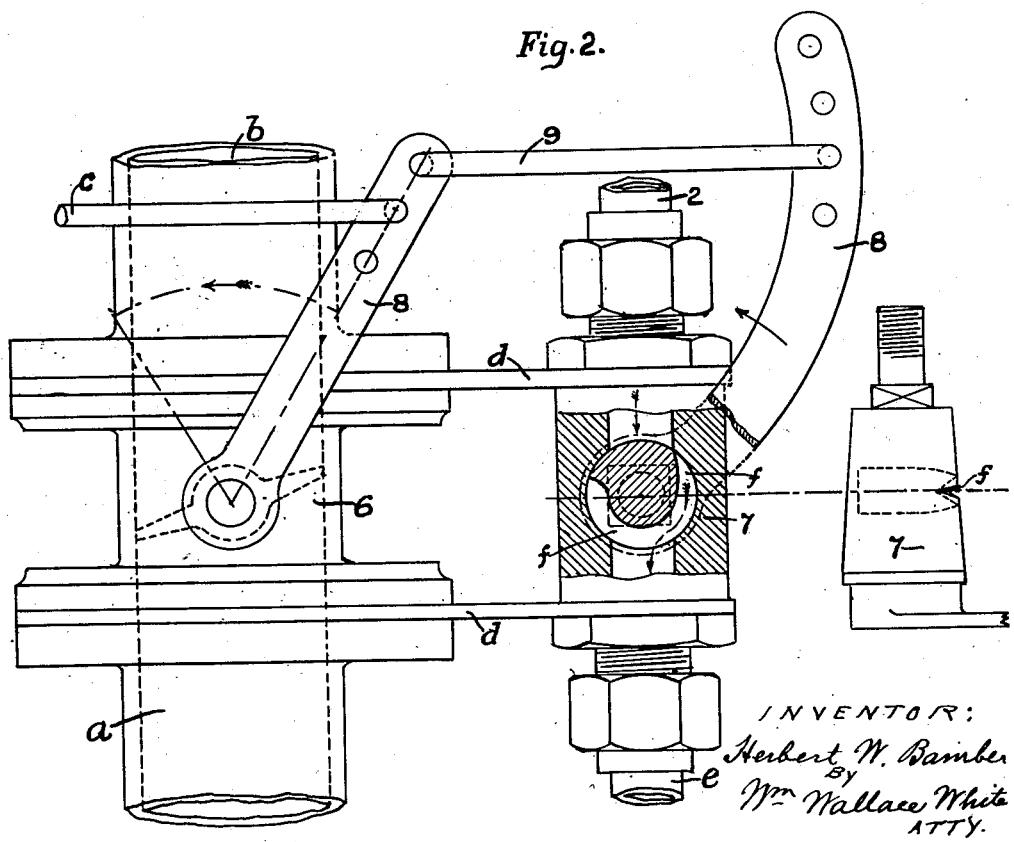

Figure 1 diagrammatically illustrates the method of feeding the water by gravity and the interconnection of the egress and water supply valve in the conduit leading to the float chamber as aforesaid and Figure 2 shows a practical example of interconnection of water control and the throttle valve of the engine.

Referring to Figure 1, which is a diagram illustrating the controlling apparatus applied to a gas producer or generator that is fed with water from an elevated storage tank, 1 represents the water storage tank, 2 the pipe leading therefrom to the float-chamber 3 whereby the supply to the generator 4 through the pipe 5 is maintained at a suitable level. As hereinbefore stated, the float chamber 3 is similar to those commonly employed for controlling the supply of gasoline to the carburetors of internal combustion engines, and since the construction and operation of these devices are well known, it would seem to be unnecessary to describe the same in detail herein, it being sufficient to state that the supply of water to the float chamber 3 is controlled by a needle valve which is moved toward and away from its seat in response to the falling and rising movements of the float in the manner which is well understood. 6 is the throttle valve of the engine, and 7 is a similar valve interposed in the pipe 2 governing the water supply to the float chamber 3, the said valves 6 and 7 being interconnected by levers 8 and connecting-rod 9. 10 represents the receptacle or small boiler within the generator 4 whereby the water is evaporated and emitted through the jets or nozzles 11 into the charge for the production of the gas.

It has been found in practice that when the engine is stopped and the generator out of use or some time there is an accumulation of water in that portion of the pipe 2 between the float chamber and the valve 7 sufficient to supply the generator with steam until such time as the engine is again started, when a fresh supply of water to the float chamber is automatically delivered by the actuation of said valve 7.

It may be observed that with this arrangement an advantage accrues inasmuch as when the engine is stopped, that is to say the throttle is closed, the heat of the generator evaporates the water remaining in the receptacle 10, float chamber 3 and connecting pipes whereby the same are emptied, and on re-opening the throttle, the time required to refill these parts allows the generator, due to the suction produced by the engine, to attain a sufficient degree of heat or incandescence to permit of the correct supply of water and thus avoid the detrimental cooling effect on the charge of the generator by the introduction of an excess of water under such circumstances which would otherwise inevitably occur.

Referring to Figure 2 $a$ is the gas pipe to which is attached the throttle valve 6 governing the supply to the induction pipe $b$. This throttle valve 6 is provided with the lever 8 that is operated by the ordinary throttle control rod $c$. The water regulating cock 7 is supported adjacent to the throttle valve 6 by the two plates $d$ and is provided with an inlet pipe 2 connected to the elevated storage tank and an outlet pipe $e$ leading to the small boiler of the generator. The plug cock 7 is provided with a V-shaped groove $f$ that increases in depth around its periphery so that the more the throttle valve 6 is opened the greater the amount of water permitted to pass through the cock 7 to the outlet pipe $e$. The plug cock 7 being directly connected to the throttle valve 6 by its lever 8 and connecting rod 9 is automatically operated thereby so that movement of the water supply cock is synchronized with that of the throttle valve.

I make no claim to the gas generator per se, and therefore have deemed it sufficient to illustrate the same only conventionally. The apparatus is heated from any convenient source and a mixture of air and the products of combustion, together with the steam emitted from the boiler 10, are caused to pass upward through the charge in the generator 4, said mixture being thus converted into producer gas, which passes out through the pipe 12 leading to the engine and which pipe is controlled by the throttle valve 6 as hereinbefore described.

What I claim is—

In a producer gas plant for automobiles, the combination of a generator, a storage tank disposed at a higher elevation than said generator, a float chamber between the generator and tank, a valve-controlled pipe line in communication with said tank and float chamber whereby the level of water in the boiler situated near to the grate of said generator is maintained, means for conducting gas from the generator to the automobile engine, a throttle valve for controlling said gas supply, means for operating said throttle valve, and interconnecting said means with said valve-controlled pipe line for regulating the water supply to said float chamber synchronously with the actuation of the throttle valve.

In testimony whereof I affix my signature.

HERBERT WILLIAM BAMBER.